July 12, 1932.  C. E. DONAHOO  1,866,630
FRUIT AND VEGETABLE CUTTER
Filed May 1, 1929   2 Sheets-Sheet 2
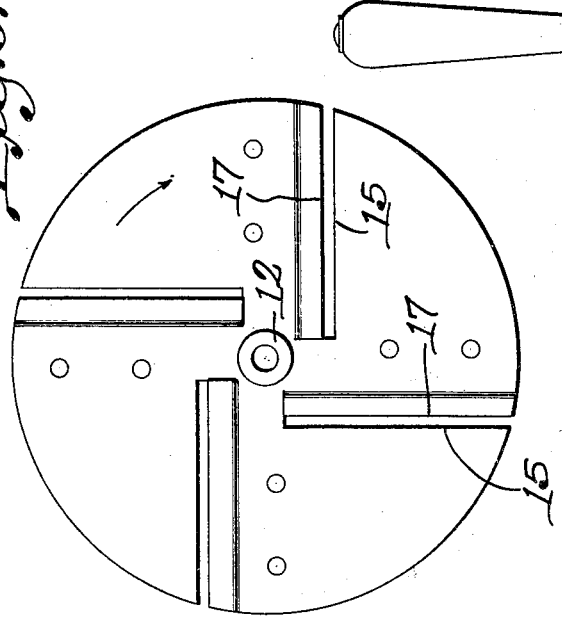
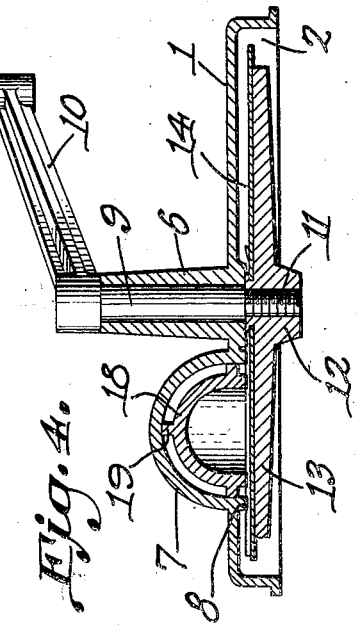
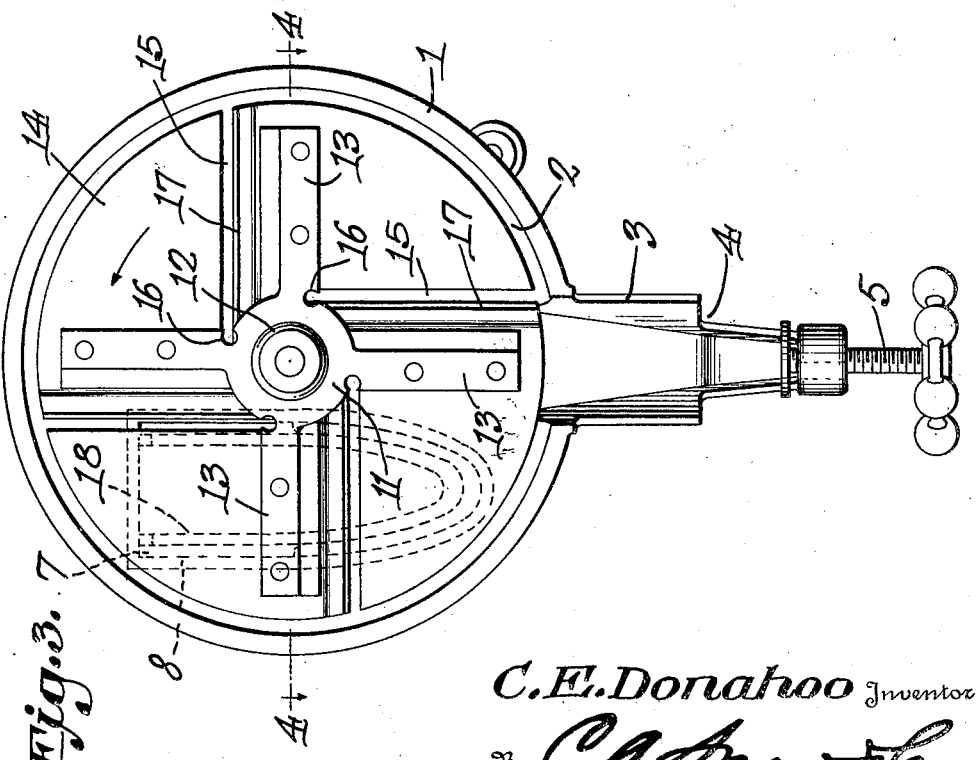
C. E. Donahoo Inventor Patented July 12, 1932

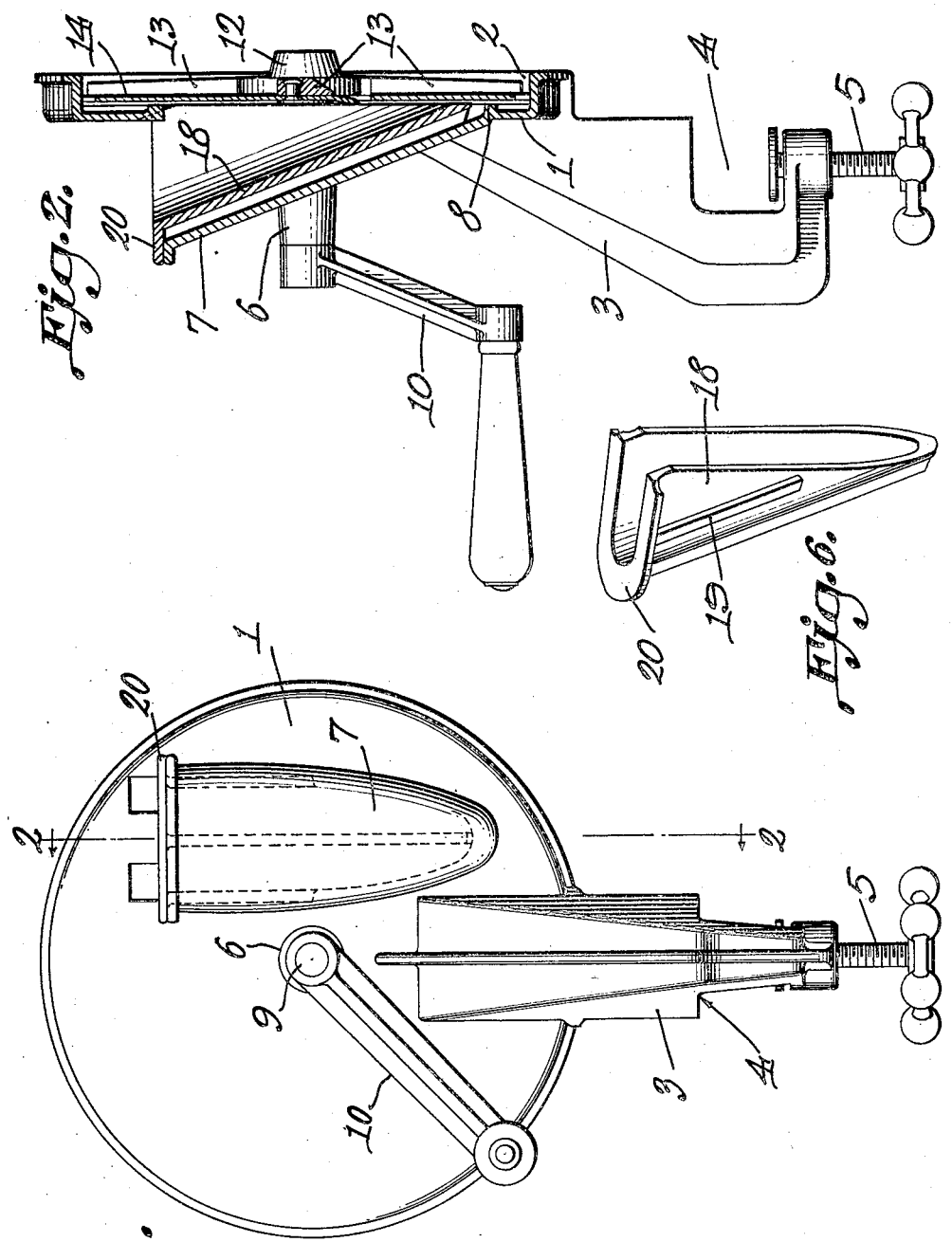

1,866,630

UNITED STATES PATENT OFFICE

CHARLES E. DONAHOO, OF EAST MOLINE, ILLINOIS

FRUIT AND VEGETABLE CUTTER

Application filed May 1, 1929. Serial No. 359,644.

This invention relates to a fruit and vegetable cutter, one of the objects being to provide a simple and efficient device of this character which can be used for cutting fruits and vegetables of different sizes, the severed particles falling freely from the device into any receptacle provided therefor.

Another object is to provide a cutter having a hopper with interchangeable linings whereby the same can be adapted to fruits and vegetables of different sizes.

A further object is to provide a cutter utilizing a disk mounted for rotation in a plane extending across one side of the feed hopper, said disk having blades disposed at such angles as to cut freely through the fruit or vegetable, the latter being held by gravity in proper position to be cut.

A still further object is to provide a cutter the blades of which are self-sharpening.

With the foregoing and other objects in view which will appear as the description proceeds the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawings the preferred form of the invention has been shown.

In said drawings,

Figure 1 is a front elevation of the device.
Figure 2 is a section on line 2—2, Figure 1.
Figure 3 is a rear elevation of the cutter.
Figure 4 is a section on line 4—4, Figure 3.
Figure 5 is an elevation of the cutting disk.
Figure 6 is a perspective view of one of the inserts or linings that can be used in the feed hopper.

Referring to the figures by characters of reference, 1 designates the body of the cutter preferably in the form of a disk having a recess 2 in one side, there being a hollow supporting bracket 3 preferably integral with the bottom portion of the body and cut away, as at 4, to receive the edge of a table top or the like. A clamping screw 5 is mounted in the lower portion of the bracket 3 and is adapted to cooperate with the upper wall of recess 4 to grip that portion of a table top inserted into the recess.

As before stated the bracket 3 is recessed or hollow as shown particularly in Figure 3 and the bottom portion of the wall of recess 2 is removed so that the interior of the bracket 3 thus communicates with the recess 2 and affords an outlet for cut material.

A bearing boss 6 extends from the body 1 and at one side of this boss the body is formed with a feed hopper 7 the outer wall of which is curved transversely as shown particularly in Figure 4 while the inner wall is cut away so that the hopper opens at its inner side throughout its length into the recess 2. A rib 8 is made integral with the body 1 and extends around the open inner side of the hopper.

A shaft 9 is journaled in the boss or sleeve 6 and has a crank arm 10 or other operating means at one end thereof while its other end is screw-threaded as shown at 11 and detachably engages the center of a spider made up of a hub 12 and radial arms 13.

A cutter disk 14 formed preferably of steel is riveted or otherwise fastened to the arms 13 and is provided in advance of each of the arms 13 with a slit 15 parallel with said arms 13 and extending from the periphery of the disk 14 inwardly to a notch 16 in the top edge of the next adjoining arm 13 in advance of the slit. This is clearly illustrated in Figure 3. That edge or wall of the slit 15 nearest the arm 13 is bent inwardly toward the body 1 and is beveled to a cutting edge as shown at 17. Thus when the cutting disk 14 is rotated in the direction indicated by the arrow in Figure 3 each cutting blade formed by the offset portion of disk 14 with its cutting edge 17 will come against and ride along the rib 8 and sweep across the open inner side of the hopper 7 thereby to produce a shearing cut through an object seated in the hopper and pressing laterally against the disk 14. As shown in Figure 3 each cutting edge, when it first reaches the open side of the hopper 7, assumes a substantially vertical position parallel with the near side of the hopper but, as the disk rotates in the direction indicated by the arrow in said figure, this edge will swing downwardly across the open side. As it cuts through the vegetable or the like bearing against disk 14, it will also ride along the rib 8 and be sharpened thereby, the severed particle being caused to pass through the adjacent slit 15 and fall by gravity into the recess 2 from which it will drop into a suitable container positioned beneath the opening in the bottom of recess 2.

As the hopper 7 is tapered downwardly relative to the body 1, a fruit or vegetable placed therein will become wedged between the hopper and the disk 14, thereby expediting the cutting operation. The edges 17, while cutting through the fruit or vegetable also serve to drag the same downwardly within the hopper and become more firmly wedged therein.

Where small fruits or vegetables are to be used, the hopper can be provided with a lining 18 of practically the same cross sectional contour as the hopper 7. This lining can be formed with spacing ribs 19. A flange 20 at the top of the lining will rest on the upper end of the hopper and support the lining in spaced relation relative to the hopper and the cutting disk. This is clearly shown in Figures 1 and 2.

The free edge of the open side of the lining is supported flush with rib 8 as shown in Figure 4 so as to cooperate therewith as a sharpening means for the cutting edges 17, this sharpening edge of the lining being renewable and replaceable therewith.

Obviously by unscrewing the shaft 9 from the hub portion 12 of the spider the cutting disk can be detached from the body 1 and cleaned or repaired.

What is claimed is:

A device of the class described including a recessed body having a marginal outlet, a hopper inclined relative to the body and opening laterally thereinto throughout the height of the hopper between the center of the body and the margin thereof, a spider mounted for rotation in the recessed body, a disk secured to the side of the spider and having slots extending thereinto from the margin, the advancing edges of these slots constituting cutting edges each arranged parallel with but in advance of one of the arms of the spider, the arms of the spider being secured to the disk to constitute radial reinforcements therefor, a lining removably mounted in the hopper, spacing ribs thereon, the free edge of the lining being positioned for wiping engagement by the cutting edges thereby to constitute renewable sharpening means, a sharpening rib extending from the body and around the open inner side of the hopper for wiping engagement by the cutting edges of the disk during the rotation of the disk to sharpen said edges, and means connected to the spider for rotating the disk.

In testimony that I claim the foregoing as my own, I have hereto affixed my signature.

CHARLES E. DONAHOO.